United States Patent [19]

Rubinstein et al.

[11] 4,029,968

[45] June 14, 1977

[54] STACKED RACKS FOR STORING SPENT NUCLEAR FUEL ELEMENTS

[75] Inventors: Herbert J. Rubinstein, Los Gatos; James D. Gilcrest, San Jose, both of Calif.

[73] Assignee: Nuclear Services Corporation, Campbell, Calif.

[22] Filed: Sept. 11, 1975

[21] Appl. No.: 612,533

[52] U.S. Cl. ............................. 250/507; 250/518
[51] Int. Cl.² ..................................... G21F 5/00
[58] Field of Search .......... 250/506, 507, 496, 518; 176/30, 27, 28

[56] References Cited

UNITED STATES PATENTS

| | | | |
|---|---|---|---|
| 3,046,403 | 7/1962 | Montgomery | 250/507 |
| 3,247,070 | 4/1966 | Challender et al. | 176/30 |
| 3,255,896 | 6/1966 | Sklorz | 176/30 |
| 3,859,533 | 1/1975 | Suvanto | 250/507 |

*Primary Examiner*—Harold A. Dixon
*Attorney, Agent, or Firm*—Jack M. Wiseman

[57] ABSTRACT

Racks for storing spent nuclear fuel elements in a spent fuel storage pool are placed in the pool one above the other. Guide pins and guide pin receptacles mate for the alignment of the racks one above the other. A frame-like support removably holds the racks one above the other. Interengaging members between the racks and the frame-like support retain the racks in position relative to the frame-like support.

6 Claims, 9 Drawing Figures

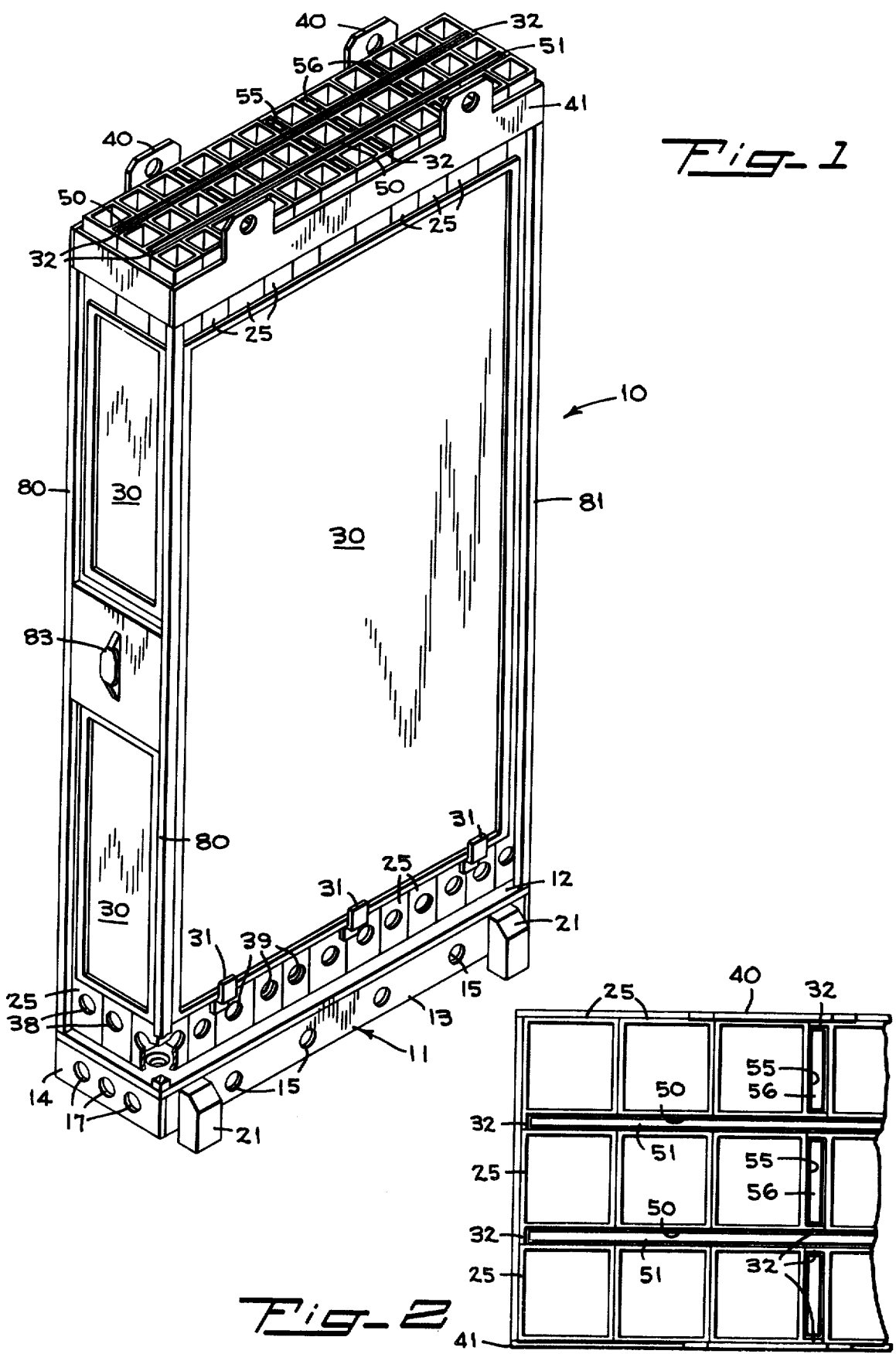

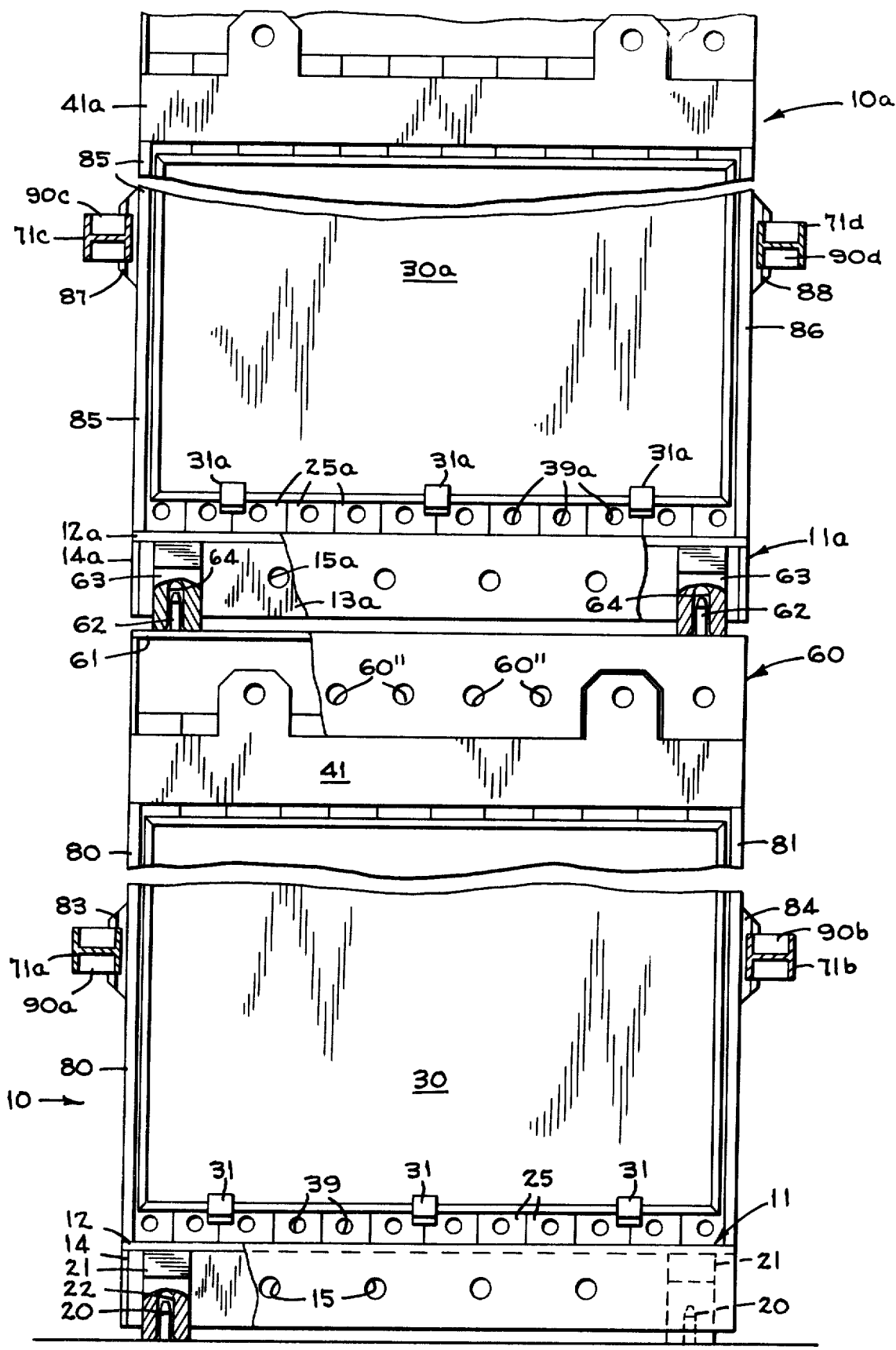
Fig_3

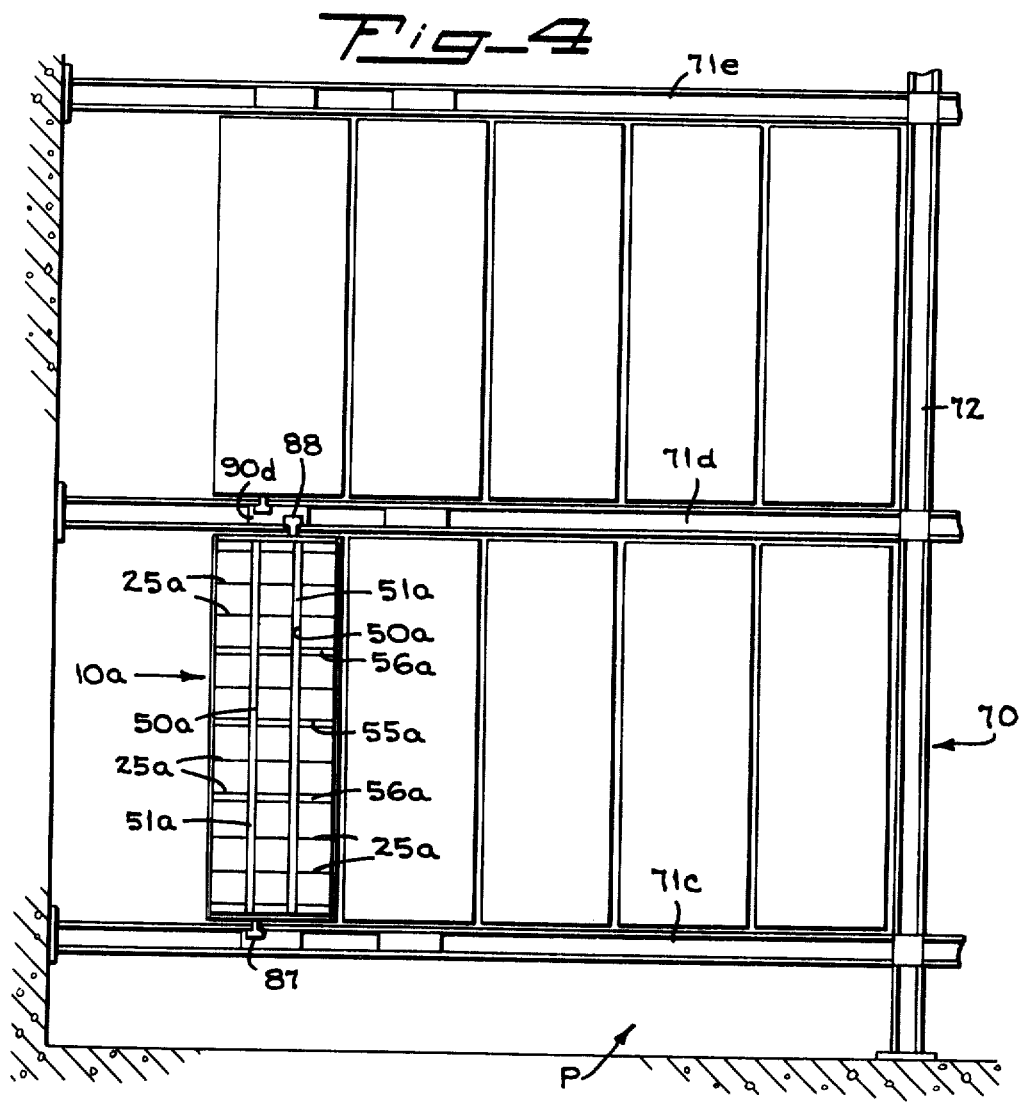
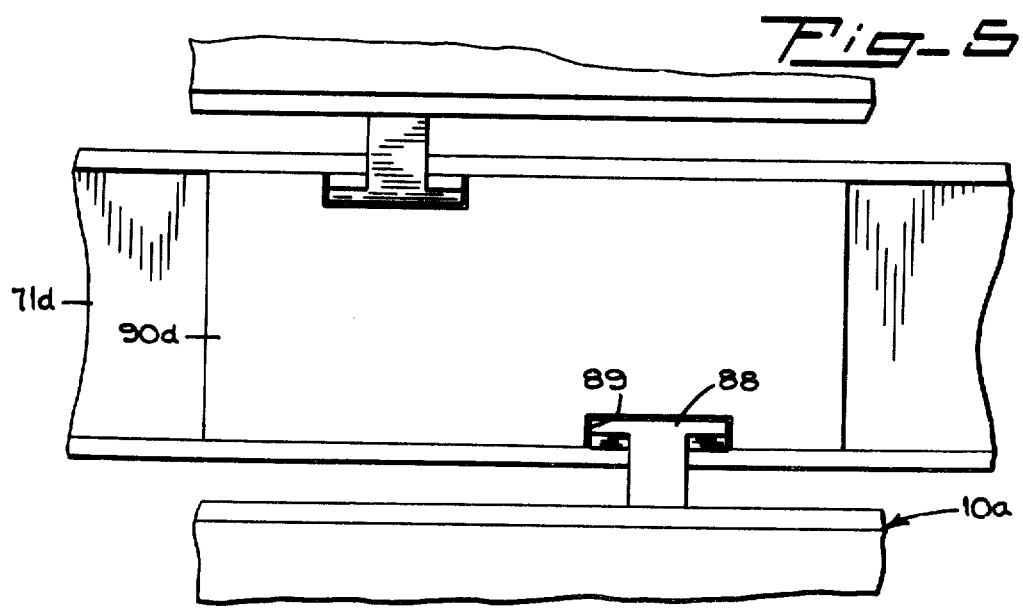

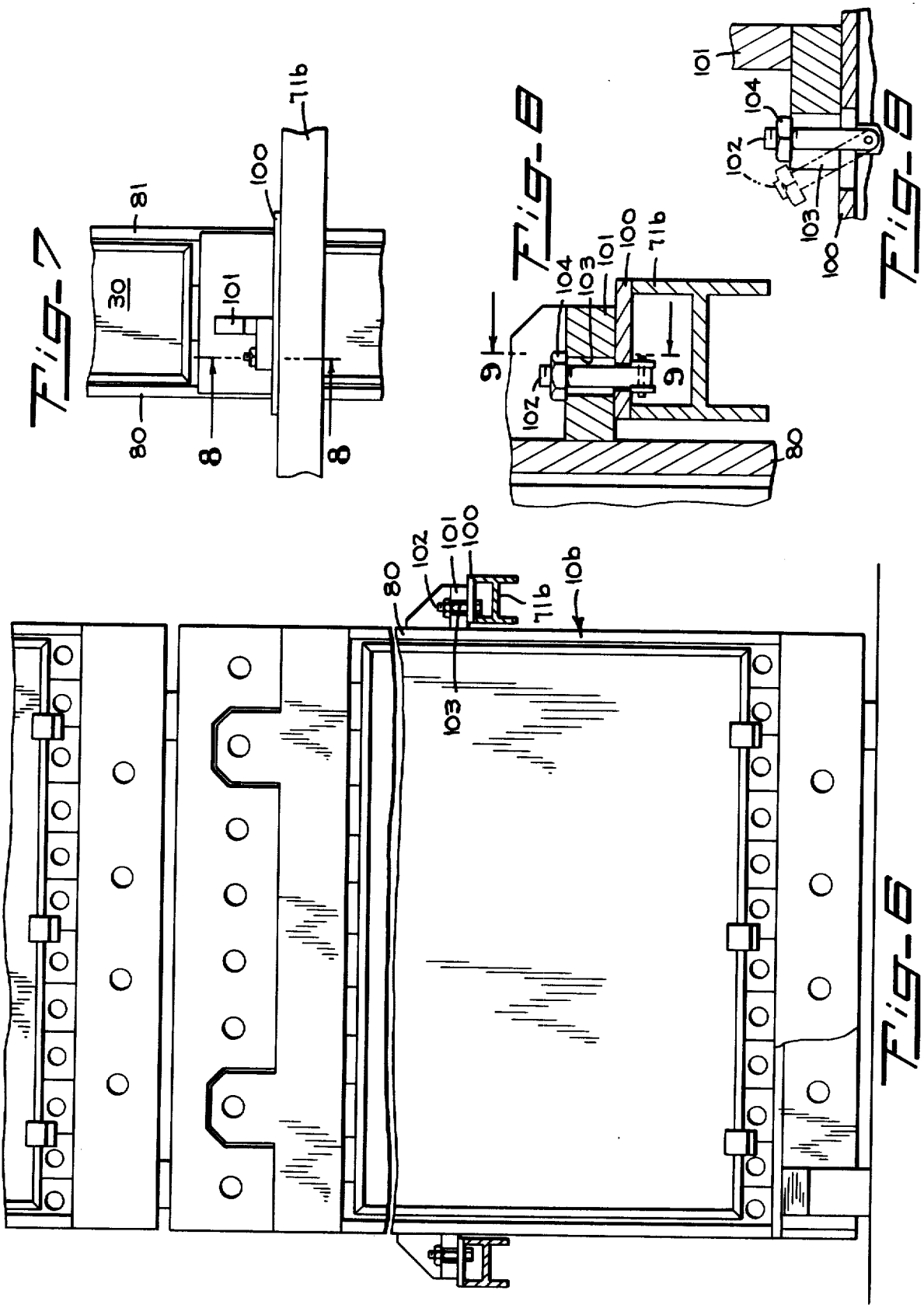

STACKED RACKS FOR STORING SPENT NUCLEAR FUEL ELEMENTS

BACKGROUND OF THE INVENTION

The present invention relates in general to the storage of nuclear fuel elements and more particularly to the arrangement of racks for the storing of spent nuclear fuel elements in a pool for a nuclear power plant.

Heretofore, racks for spent nuclear fuel elements were placed side-by-side in a pool. Thus, a considerable amount of floor space was required. However, the delay in the availability of nuclear fuel reprocessing plants have presented the problem to nuclear power plants of being able to transport the spent fuel elements to a reprocessing plant. When a reactor is refueled, the spent fuel elements are stored in the spent fuel storage pool of a nuclear power plant. Spent fuel storage pools for the nuclear power plant have been designed to store one full reactor core plus one or two reloads of nuclear fuel elements. It is desirable to always maintain enough space in the spent fuel storage pool to unload the full reactor core. Generally, this would leave space for only one or two reloads of nuclear fuel elements. A nuclear power plant should have sufficient space for the spent nuclear fuel elements to enable the nuclear power plant to keep operating and refueling until it is possible to transport spent nuclear fuel elements to a reprocessing plant.

SUMMARY OF THE INVENTION

Racks for storing nuclear fuel elements are disposed one above the other.

By virtue of the present invention, a greater number of spent fuel elements can occupy the same floor space and still maintain the effective multiplication factor ($K_{eff}$) below the required limit. Accordingly, nuclear power plants will have sufficient space to store a greater number of spent reactor fuel elements until a reprocessing plant can accommodate the transportation of the spent reactor fuel elements. As a result thereof, the shutdowns of nuclear power plants will be reduced.

The decrease in floor space requirements for spent reactor fuel elements achieved by the present invention is applicable to both the boiling water reactor and the pressurized water reactor. By decreasing the floor space requirements, the capacity of a given storage pool for storing spent fuel elements is increased. Hence, the pool can accommodate a greater number of spent nuclear fuel elements. This results in an increase of storage time capability. The additional space capacity for the spent nuclear fuel elements is desirable to enable a nuclear power plant to keep operating and refueling until it is possible to transport spent fuel elements to a reprocessing plant.

A feature of the present invention is the employment of guide pins and guide pin receptacles for the alignment of the racks for storing nuclear fuel elements one above the other.

Another feature of the present invention is the employment of frame-like support for removably holding racks for storing nuclear fuel elements one above the other.

A still further feature of the present invention is the interengaging members between the racks for storing nuclear fuel elements and the frame-like support to retain the racks in position relative to the frame-like support.

DESCRIPTION OF THE DRAWINGS

FIG. 1 is a perspective view of a rack for storing spent nuclear fuel elements in a boiling water reactor nuclear power plant.

FIG. 2 is a fragmentary enlarged plan view of the rack shown in FIG. 1.

FIG. 3 is an elevation view of racks of the type shown in FIG. 1 for storing spent nuclear fuel elements disposed one above the other in accordance with the present invention and illustrated with a frame-like support.

FIG. 4 is a plan view of an assembly of racks of the type shown in FIG. 1 for storing spent nuclear fuel disposed one above the other as shown in FIG. 3 and illustrated in a spent fuel storage pool with a frame-like support shown in FIG. 3.

FIG. 5 is an enlarged plan view of interengaging members between the racks of the type shown in FIG. 1 for storing nuclear fuel elements and the frame-like support shown in FIGS. 3 and 4.

FIG. 6 is a fragmentary elevation view of racks of the type shown in FIG. 1 for storing spent nuclear fuel elements disposed one above the other and illustrating a modification of the interengaging members between racks of the type shown in FIG. 1 for storing nuclear fuel elements and the frame-like support shown in FIGS. 3 and 4.

FIG. 7 is an end view of the interengaging members shown in FIG. 6 between racks of the type shown in FIG. 1 for storing nuclear fuel elements and the frame-like support shown in FIGS. 3 and 4.

FIG. 8 is an enlarged front elevation view of the interengaging members shown in FIGS. 6 and 7.

FIG. 9 is a vertical section view taken along line 9—9 of FIG. 8.

DESCRIPTION OF THE PREFERRED EMBODIMENT

Illustrated in FIGS. 1 and 2 is a rack 10 for storing spent nuclear fuel elements in a boiling water reactor nuclear power plant. The rack 10 has been generally disclosed in an application filed by Herbert J. Rubinstein, Philip M. Clark and James D. Gilcrest on July 11, 1975, Ser. No. 595,444, entitled Rack For Storing Spent Nuclear Fuel Elements. The assignee of the present application is the same as the assignee for the aforementioned application. The present invention is equally applicable for racks for storing spent nuclear fuel elements in a pressurized water nuclear power plant. Such racks have been described in detail in the just-mentioned pending application.

The rack 10 for storing spent nuclear elements is conventionally disposed in a spent fuel pool P for a nuclear power plant. The spent fuel pool P is well-known. However, for the purposes of the present invention, the spent fuel pool P may be deeper than conventional spent fuel pools, although this is not essential. The pool P, of course, contains water and all the racks for storing spent nuclear fuel elements disposed therein are submerged in the water.

The rack 10 comprises a suitable base 11. In the exemplary embodiment, the base 11 includes a horizontal base plate 12 of a rectangular configuration, which is made of a case or fabricated metal, such as aluminum or steel. Depending from the base plate 12 are four longitudinally extending, transversely spaced support member 13 and four transversely extending, longitudinally spaced support members 14. The members 13 and 14 are vertically disposed are are made of cast or fabricated metal, such as aluminum or steel. The members 13 and 14 are suitably fixed to the base plate 12, such as by welding. Openings 15 are formed in the members 13 as passageways for water. Likewise, openings 17 are formed in the members 14 as passageways for water.

A feature of the present invention is the provision of guide pins 20 (FIG. 3), which are fixed to the bottom of the pool P in the upright position. Depending from the base 11 are four feet 21. Formed in the feet 21 are suitable receptacles 22 (FIG. 3) which receive respectively the guide pins 20 for aligning the rack 10 in the pool P.

Fixed to the base plate 12 by suitable means, such as welding, is a plurality of upstanding nuclear fuel element enclosures 25. In the preferred embodiment, each of the enclosures 25 is formed with a generally square cross-sectional area to dispose therein a spent nuclear fuel element of the type employed in nuclear power plants. The enclosures 25 are preferably made of aluminum or stainless steel. Openings 38 and 39 are formed in the enclosures 25 a passageways for water.

In the exemplary embodiment, each enclosure 25 has an inside cross-sectional dimension of six inches. The outside cross-sectional dimension can suitably be six and one-half inches. Additionally, each enclosure 25, in the exemplary embodiment, is approximately thirteen feet or fourteen feet long. In rack 10, the enclosures 25 form, in the exemplary embodiment, three columns which are spaced apart. The spaces between columns of enclosures 25 form pockets 50. The bottoms of the pockets 50 are formed by the base plate 12, the sides of the pockets 50 are formed by confronting walls of the spaced apart enclosures 25 and the ends of the pockets 50 are formed by extensions 32. Disposed within the pockets 50 are suitable neutron absorbers, such as sheets 51 of Boral. Other high absorption neutron absorbers, such as cadmium, borated stainless steel, or poisoned plastic sheets, may also be employed. Extensions 32, preferably, extend along the entire length of the enclosures 25 associated therewith and are of projected dimension from the associated enclosure equal to the distance between confronting walls of spaced apart enclosures 25. In the exemplary embodiment, the thickness of each of the sheets 51 of Boral is ⅛ inch. The sheets 51 of Boral extend along the length of the enclosures 25 in an area corresponding to the active length of the nuclear fuel elements.

Boral is sold by Brooks & Perkins Corporation and comprises boron carbide particles disposed in an aluminum metal. The Boral sheets serve as a neutron absorber.

Selected rows of enclosures 25 are spaced apart to form pockets 55. The bottom of the pockets 55 is the base plate 12, the sides of the pockets 55 are the confronting walls of spaced apart enclosures 25, and the ends of the pockets 55 are the extensions 32. Disposed within the pockets 55 are suitable neutron absorbers, such as sheets 56 of Boral. Other neutron absorbers may be employed as above-mentioned. In the exemplary embodiment, the thickness of each sheet 56 of Boral is ⅛ inch. The sheets 56 of Boral extend along the length of the enclosures 25 in an area corresponding to the active length of the nuclear fuel elements.

In a typical embodiment, there are ten or twelve rows of enclosures 25 and three columns of enclosures 25. Contiguous enclosures are preferably welded together along the lengths thereof for rigidifying the rack 10. The rack 10, in the exemplary embodiment, provides storage areas for thirty-six or thirty nuclear fuel elements.

Surrounding the sides and ends of the rack 10 are vertically disposed panels, such as panels 30 of Boral sheets. Other high absorption neutron absorbers, such as cadmium sheets, borated stainless steel sheets, and the like, may also be employed. The sheets 30 of Boral serve as a neutron absorber. The sheets 30 of Boral are employed to maintain the effective multiplication factor ($K_{eff}$) for the full array below the required limit or the point of criticality. The panels 30 of Boral are supported by a weld across the top of the edge thereof. Clips 31 inhibit horizontal movement of the panels 30 and allow vertical displacement. The load on the rack is not applied to the panels 30 of Boral. Thus, thermal expansion and rack flexure are accommodated with out any load applied to the panels 30. In the exemplary embodiment, the thickness of each of the panels 30 of Boral is ¼ inch.

It is the pockets 50 that provide the enclosures for the sheets 51 of Boral for maintaining the correct positions thereof with respect to the spent reactor fuel elements for effective neutron absorption. The sheets 51 of Boral are welded to the enclosures 25 to prevent inadvertent removal from the pockets 50. Similarly, it is the pockets 55 that provide the enclosures for the sheets 56 of Boral for maintaining the correct positions thereof with respect to the spent reactor fuel elements for effective neutron absorption. Some of the sheets 56 of Boral are removable from the pockets 55 while under water for in-service inspection, while other sheets 56 of Boral are welded to the enclosures 25 to prevent inadvertent removal from the pockets 55.

Sheets of Boral, cadmium or borated stainless steel are preferred in the pockets 50 and 55 over water as a neutron absorber because Boral, cadmium and borated stainless steel have a greater shielding capacity. This allows a closer geometric spacing of spent fuel elements without exceeding the $K_{eff}$ limit. Thus, the spent nuclear fuel elements can be located closer to one another without exceeding the critical limit for the effective multiplication factor ($K_{eff}$) for the fuel array. More specifically, the spent nuclear fuel elements can be spaced closer together and the effective multiplication factor ($K_{eff}$) for the fuel array will remain below the required limit. In this manner, more spent nuclear fuel elements can occupy a given space in the storage pool of a nuclear power plant.

Welded to the outside walls of the exterior columns of enclosures 25 are suitable lift plates 40 and 41. Conventional grapples or hoisting devices grip the lift plates 40 and 41 for raising and lowering the rack 10.

According to the present invention, racks for storing spent nuclear fuel elements are placed one above the other (FIG. 3). In this manner, the floor space of a nuclear storage pool for a nuclear reactor plant can accommodate a greater number of spent nuclear reactor fuel elements. In FIG. 3, a rack 10a for storing spent nuclear fuel elements in disposed above the rack 10 for storing nuclear fuel elements. The rack 10a if similar to rack 10 and, hence, parts of the rack 10a similar in construction and operation to parts of the rack 10 have been designated with the same reference numeral accompanied by the suffix "a".

For disposing the rack 10a for storing spent nuclear fuel elements above the rack 10 for storing spent nuclear fuel elements, a rack cover 60 (FIG. 3) is placed over the rack 10. The rack cover 60 comprises a top plate 61 with depending longitudinal walls 60'. Formed in the walls 60' are suitable openings 60" for the passage of water. Welded to the top plate 51 are upstanding guide pins 62. Depending from the base plate 12a of the rack 10a are feet 63. Formed in the feet 63 are suitable receptacles 64 for receiving the pins 62, respectively. There are preferably four pins 62 and four feet 63 formed with receptacles 64. The pins 62 are located in the vicinity of the four corners of the top plate 61. The pins 62 and receptacles 64 serve to align the rack 10a relative to the rack 10.

For supporting an assembly of racks 10 and 10a, a frame-like support 70 (FIGS. 3 and 4) is provided. The frame-like support 70 comprises a plurality of parallel, longitudinally extending support members, such as I-beams 71a–71e, which are preferably made of structural steel or aluminum. Each rack, such as racks 10 and 10a, has along each end thereof a longitudinally extending support member. For example, along the ends of rack 10 are I-beams 71a and 71b, and along the ends of the rack 10a are I-beams 71c and 71d. The longitudinal support members 71a–71b extend in a tightfit relation from the wall at one side of the pool P to the confronting wall on the opposite side of the pool P. Additionally, parallel, transversely extending support members, such as I-beams, cross over the support member 71a–71e at right angles. For example, transversely extending support member 72 extends in a direction parallel to the sides of the racks from the wall at one end of the pool in tight-fitting relation. As shown in FIG. 4, the frame-like support 70 can accommodate a group of racks, such as racks 10 and 10a.

Suitable interengaging members (FIG. 3) of metal, such as steel or aluminum, are welded to upright members at the four corners of the racks and engage an adjacent inboard wall of the contiguous longitudinal support member of the frame-like support 70 to retain the rack in position relative to the frame-like support 70. For example, fixed to the rack 10 are upright member 80 and 81 of suitable metal material, such as steel or aluminum. The upright members 80 and 81 are disposed at opposite ends of the rack 10. Interengaging member 83 is welded to the upright members 80 at one end of the rack, and interengaging member 84 is welded to the upright members 81 at the other end of the rack 10.

Similarly, fixed to the rack 10a are upright members 85 and 86 of suitable metal material, such as aluminum or steel. The upright members 85 are positioned at opposite ends of the rack 10a. Interengaging member 87 is welded to the upright members 85 at one end of the rack 10a, and interengaging member 88 is welded to the upright members 86 at the other end of the rack 10a.

Illustrated in FIG. 5 is the I-beam 71d and the interengaging member 88 for the other end of the rack 10a. While the interaction between the I-beam 71d and the interengaging member 88 will be described in detail, it is understood that the interaction and construction of the other I-beams and interengaging members will be similar.

The interengaging member 88 has a T-shape configuration with the stem of the T-shaped member fixed to the rack 10a and received by a suitable openin 89 (FIG. 5) formed in the I-beam 71d. The cross-piece of the interengaging member engages an adjacent inboard wall of the I-beam 71d and is of greater dimension than the opening 89 so as to engage the inboard walls of the I-beam 71d adjacent thereto. Through this arrangement, the rack 10a can be raised by grapples or a hoist gripping the lifting members 40a and 41a to remove the rack 10a from the pool P. On the other end, the rack 10a is retained, through this arrangement, securely in the pool P by the frame-like support 70. To avoid the weakening of the I-beams 71a–71e because of the openings formed therein to accommodate the stems of the T-shaped support members, suitable blocks are fixed thereto in the vicinity of the openings, such as metal blocks 90a–90d.

Illustrated in FIGS. 6–9 is a modification of the interengaging arrangement between the rack and the I-beam of the frame-like support 70. In the modification shown in FIGS. 6–9, there are no openings formed in the I-beam, such as the opening 89, to accommodate the stem of a T-shaped member. Thus, the blocks 90a–90d are not employed. Welded to the upper surface of the I-beam, such as I-beam 71b, is flat metal plate 100. Fixed to the angle membes 80 and 81 of the rack 10, such as by welding, is an angle bar 101. Formed in the base of the angle bar 101 is a suitable slot 103. A bolt 102 is swivelly attached to the plate 100 and is received by the slot 103 in the angle bar 101 to enable the rack 10 to be removably secured to the frame-like support 70. A nut 104 retains the bolt 102 in a fixed position against the angle bar 101.

We claim:

1. In combination:
    a. a first rack for storing a plurality of nuclear fuel elements;
    b. a second rack for storing a plurality of nuclear fuel elements, said second rack being disposed above said first rack; and
    c. first means including a frame-like support engaging said first and second racks for removably retaining said first and second racks in a predetermined position,
    d. said first and second racks including oppositely directed first members engaging said frame-like support for removably retaining said first and second racks in the predetermined position, said frame-like support including parallel second members engaged respectively by said first members for removably retaining said first and second racks in the predetermined position.

2. A combination as claimed in claim 1 wherein each of said first members are formed with a stem and a crosspiece, each of said stems being received by an opening formed in associated second member and each of said cross-pieces being in contact with an inboard wall of its associated second member for removably retaining said first and second racks in the predetermined position.

3. A combination as claimed in claim 1 wherein each of said first members is formed with a slotted plate and each of said second members has a swivel bolt connected thereto to be received by the slot of the plate of its associated first member for removably retaining said first and second racks in the predetermined position.

4. A rack for nuclear fuel elements comprising:

a. a base;
b. a plurality of upstanding enclosures fixed to said base for containing respectively a nuclear fuel element, adjacent enclosures being spaced apart to form vertically disposed pockets;
c. neutron absorber disposed in said pockets for controlling nuclear reactivity;
d. upstanding members disposed exteriorly of said enclosures; and
e. oppositely directed means on confronting upstanding members for supporting said rack, said means having a T-shape with the stem thereof projecting outwardly from the associated upstanding member and the cross-piece thereof rendering support to said rack.

5. A rack for nuclear fuel elements comprising:
a. a base;
b. a plurality of upstanding enclosures fixed to said base for containing respectively a nuclear fuel element, adjacent enclosures being spaced apart to form vertically disposed pockets;
c. neutron absorber disposed in said pockets for controlling nuclear reactivity;
d. upstanding members disposed exteriorly of said enclosures; and
e. oppositely directed means on confronting upstanding members for supporting said rack, said means having an L-shape fixed to its associated upstanding member and formed with a slot in the base thereof for supporting the rack.

6. A rack for nuclear fuel elements comprising:
a. a base;
b. a plurality of upstanding enclosures fixed to said base for containing respectively a nuclear fuel element, adjacent enclosures being spaced apart to form vertically disposed pockets;
c. neutron absorber in said pockets for controlling nuclear reactivity;
d. upstanding members disposed exteriorly of said enclosure;
e. oppositely directed means on confronting upstanding members for supporting said rack;
f. a cover disposed over the top of said enclosures; and
g. rack alignment means supported by said cover.

* * * * *